(12) United States Patent
Nanasawa et al.

(10) Patent No.: US 8,995,093 B2
(45) Date of Patent: Mar. 31, 2015

(54) PIVOT BEARING UNIT FOR HARD DISK ACTUATOR

(75) Inventors: Toru Nanasawa, Fujisawa (JP); Naoto Horiuchi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/982,930

(22) PCT Filed: Jun. 27, 2012

(86) PCT No.: PCT/JP2012/066435
§ 371 (c)(1),
(2), (4) Date: Jul. 31, 2013

(87) PCT Pub. No.: WO2013/015065
PCT Pub. Date: Jan. 31, 2013

(65) Prior Publication Data
US 2013/0301160 A1    Nov. 14, 2013

(30) Foreign Application Priority Data

Jul. 27, 2011  (JP) ................................ 2011-164759
Feb. 23, 2012  (WO) .................. PCT/JP2012/054448

(51) Int. Cl.
G11B 5/48    (2006.01)
G11B 33/14   (2006.01)
G11B 5/55    (2006.01)
F16C 33/78   (2006.01)
(Continued)

(52) U.S. Cl.
CPC .......... *G11B 33/1473* (2013.01); *G11B 5/5569* (2013.01); *F16C 33/7846* (2013.01); *F16C 33/805* (2013.01); *F16C 19/54* (2013.01); *G11B 25/043* (2013.01); *F16C 2370/12* (2013.01)
USPC ................... 360/265.3; 360/265.2; 360/265.4

(58) Field of Classification Search
USPC .......... 360/265.2, 265.3, 265.4, 265.5, 265.6, 360/98.07, 99.08
See application file for complete search history.

(56) References Cited

U.S. PATENT DOCUMENTS 5,876,124 A    3/1999  Zang et al.
5,999,373 A *  12/1999 Allsup et al. ............... 360/265.6
(Continued)

FOREIGN PATENT DOCUMENTS

CN    1532430 A      9/2004
CN    202937653 U    5/2013
(Continued)

OTHER PUBLICATIONS

International Search Report dated Sep. 18, 2012 issued in International Application No. PCT/JP2012/066435 (PCT/ISA/210&220).
Written Opinion dated Sep. 18, 2012 issued in International Application No. PCT/JP2012/066435 (PCT/ISA/237).
(Continued)

*Primary Examiner* — Jefferson Evans
(74) *Attorney, Agent, or Firm* — Sughrue Mion, PLLC

(57) ABSTRACT

In an HDD actuator pivot bearing unit 10, an axial inner surface 22a of a shield cap 22 is formed into a stepped shape so that an axial minimum gap a1 with a shield member 14e of one bearing 14 is narrower than an axial minimum gap a2 with an outer ring 14b and so that an axial minimum gap a3 with a boundary position 14b3 between an axial end face of the outer ring 14 and an annular groove 14b1 is narrower than the axial minimum gap a2 with the outer ring 14. By doing so, the amount of air passing through an interior of the bearing can be reduced to thereby reduce outparticles.

10 Claims, 6 Drawing Sheets

(51) Int. Cl.
*F16C 33/80* (2006.01)
*F16C 19/54* (2006.01)
*G11B 25/04* (2006.01)

(56) References Cited

U.S. PATENT DOCUMENTS

| | | |
|---|---|---|
| 6,296,391 B1 | 10/2001 | Hayakawa et al. |
| 6,574,076 B1 * | 6/2003 | Koyama .................... 360/265.3 |
| 8,116,030 B2 * | 2/2012 | Haynes et al. ............. 360/99.08 |

FOREIGN PATENT DOCUMENTS

| | | |
|---|---|---|
| EP | 1 394 775 A1 | 3/2004 |
| JP | 2001-3943 A | 1/2001 |
| JP | 2004-92666 A | 3/2004 |
| JP | 2007-138991 A | 6/2007 |

OTHER PUBLICATIONS

Office Action, Issued by the State Intellectual Property Office of P.R. China, Dated Aug. 1, 2014, in counterpart Chinese Application No. 201210262643.4.

* cited by examiner

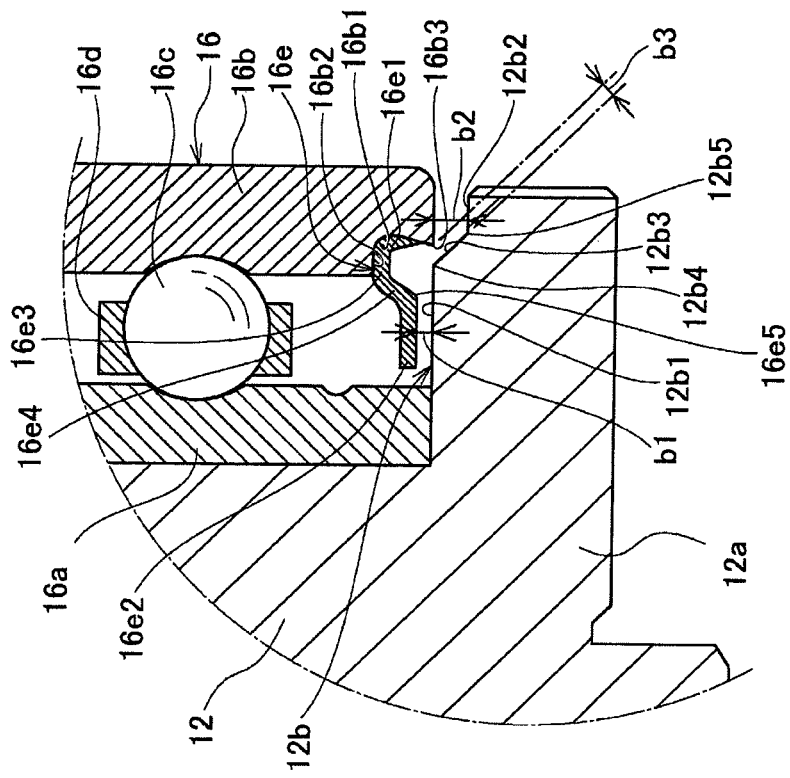
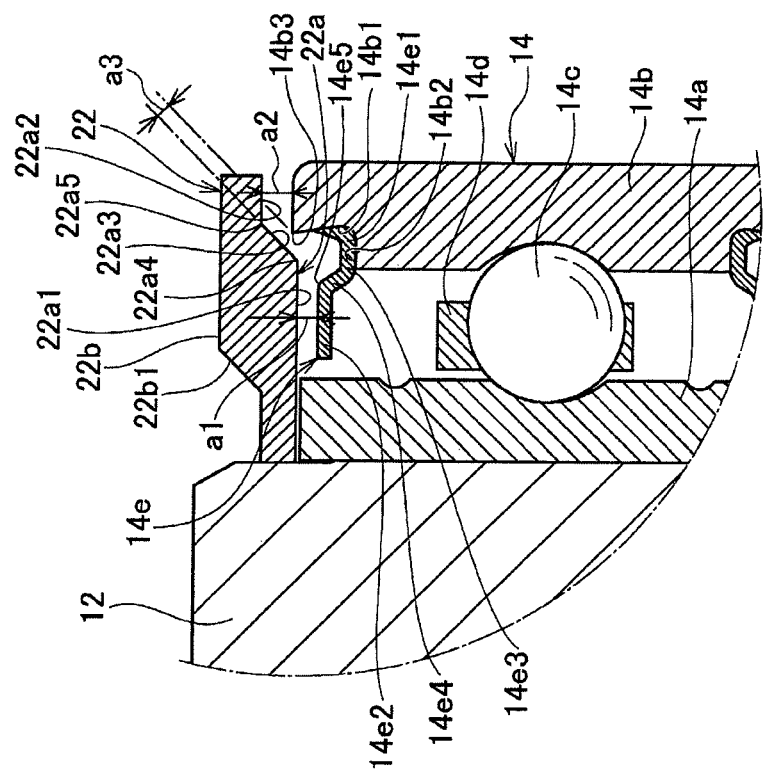
FIG. 2A
FIG. 2B

PIVOT BEARING UNIT FOR HARD DISK ACTUATOR

TECHNICAL FIELD

The present invention relates to a pivot bearing unit for a hard disk actuator and more particularly to a pivot bearing unit for a hard disk actuator in which an amount of air which passes through an interior of a bearing to thereby reduce out particles.

BACKGROUND ART

FIGS. 3A to 3C show an example of a schematic configuration of a hard disk drive (Hereinafter, also referred to as HDD). This HDD includes a magnetic disk (a hard disk) 2 which records information (data), a spindle motor 4 which rotates the magnetic disk 2, a swing arm 8 as an actuator at a distal end portion of which a magnetic head 6 is mounted, and a voice coil 9 which is provided at a proximal end portion of the swing arm 8 to drive to rotate the swing arm 8.

The swing arm 8 is pivoted rotatably on a base Bs of the HDD via a pivot bearing unit 10 and moves the magnetic head 6 in parallel to (or causes the magnetic head 6 to trace) the rotating magnetic disk 2 when driven to rotate by the voice coil 9. By doing so, In the HDD, information can be read from the magnetic disk 2 or can be written (recorded) onto the magnetic disk 2 via the magnetic head 6.

Provided on the pivot bearing unit 10 are a shaft 12 which is erected on the base Bs of the HDD, a sleeve 18 on which the swing arm 8 is mounted, and pivot bearings 14, 16 which are interposed between the shaft 12 and the sleeve 18.

Additionally, the pivot bearings 14, 16 include inner rings 14a, 16a and outer rings 14b, 16b as pairs of bearing rings, pluralities of balls 14c, 16c as rolling elements which are assembled between the pairs of bearing rings so as to roll therebetween, and cages 14d, 16d which hold individually the balls 14c, 16c. In addition, non-contact type seal members 14e, 16e are interposed between the bearing rings so as to seal up interiors of the bearings individually, whereby not only is the intrusion of foreign matters (for example, dust particles) from the outside of the bearings into the interiors thereof prevented, but also the leakage of a grease composition placed in the interiors of the sealed bearings to the outside thereof is prevented.

Then, the pivot bearings 14, 16 support the swing arm 8 which is mounted on the sleeve 18 rotatably in such a state that the inner rings 14a, 16a are fitted on the shaft 12 and the outer rings 14b, 16b are fitted in the sleeve 18. Additionally, an annular spacer 20 is fitted in an inner circumferential portion of the sleeve 18 so as to be interposed between the pivot bearings 14, 16. By dosing so, the pivot bearings 14, 16 are positioned fixedly in a predetermined position while being preloaded in a predetermined fashion, whereby the pivot bearings 14, 16 can be rotated stably without rattling, which enables the swing arm 8 to rotate smoothly with good response.

In recent years, with a tendency to require higher density and higher capacity on hard disks (HDDs) increasing, higher mechanical accuracy and higher cleanness are also required in the interior of such hard disks. When foreign matters stick to a magnetic disk or a read head in the interior of an HDD, the performance thereof is deteriorated or a program error is triggered, and in the worst case, a failure of the HDD is called for. Therefore, higher cleanness is required in the interior of the HDD.

As one form of foreign matters generated in the interior of the HDD, there are outparticles which result from grease in a pivot bearing unit which supports an actuator. The grease in the interior of the pivot bearing unit is stirred as bearings work, whereby oil contents in the grease are discharged as a minute amount of particles, which stay in suspension in the interior of the HDD, eventually sticking to the magnetic disk and/or the read head.

Raised as methods for reducing outparticles are, for example, a method for narrowing a shield labyrinth of a bearing and a method as described in Patent Literature 1 for capturing particles by making use of the force of static electricity by forming a bearing seal member of a material having electrifying properties.

Additionally, in a hard disk drive pivot assembly described in Patent Literature 2, as shown in FIG. 6, a hub cap 140 is disclosed which is fixed to a shaft 110 so as to prevent gas or dust particles produced from grease provided in ball bearings 120 from being discharged to the outside of the assembly. This hub cap 140 is made up of an inner circumferential portion 141 and an outer circumferential portion 142 which is formed thinner than the inner circumferential portion 141.

RELATED ART REFERENCE

Patent Reference

Patent Literature 1: JP-A-2007-138991
Patent Literature 2: JP-A-2004-92666

SUMMARY OF THE INVENTION

Problems to be Solved by the Invention

Incidentally, it is considered that a strong air flow is normally generated in an interior of an HDD while the HDD is operating and that an air flow is also generated near an actuator in such a way as to pass through a pivot bearing unit. Particles are discharged to the outside of bearings by air passing through interiors of the bearings, and it becomes difficult to capture the particles only by shields in the interiors of the bearings.

Additionally, as shown in FIG. 3C, a shield cap 22 is mounted in an upper portion of a pivot unit which functions in the same way as a shield plate. Normally, since a shield cap is produced of a sheet material through pressing, existing caps 22 take either of configurations shown in FIGS. 4A and 4B. Additionally, since a certain gap needs to be defined between a shield cap and an end face of an outer ring of a bearing due to an axial runout accuracy problem, with a shield cap having either of the existing configurations, a large gap (for example, a gap A of the order of 0.25 mm) has to be defined between a shield member and the shield cap. Since outside air enters or exits from the pivot bearing unit directly through this gap portion, there are imposed limitations on reduction of outparticles by reducing the amount of air passing through the gap portion.

Further, as shown in FIG. 5, a flange portion 12a provided at an axial end portion of a shaft 12 abuts with an end face of an inner ring of a bearing, while a stepped portion is provided on an axial inner surface of the flange portion 12a so as to define a sufficient gap with an end face of an outer ring of the bearing. Due to this, large gaps (for example, a gap B o the order of 0.25 mm) are defined between the flange portion 12a and the outer ring 16b and between the flange portion 12a and a shield member 16e, and air also enters and exits from these gap portions, causing outparticles to be discharged into an interior of an HDD.

On the other hand, in the pivot assembly shown in FIG. 6, although a gap between a seal 125 and the inner circumferential portion 141 of the hub cap 140 is set small, a relatively large gap is defined at a portion lying radially outwards of the gap over a gap defined between the outer circumferential portion 142 of the hub cap 140 and an end face of an outer ring 122, and hence, a labyrinth of a sufficient distance is not formed.

The invention has been made in view of these problems, and an object thereof is to provide a pivot bearing unit for a hard disk actuator which can reduce outparticles by reducing the amount of air which passes through an interior of a bearing.

Means for Solving the Problems

The above object will be attained by the following configurations.

(1) A pivot bearing unit for a hard disk actuator including:
a shaft member having a flange portion at an axial end portion;
a pair of bearings each including an inner ring, an outer ring, a plurality of rolling elements interposed between the inner ring and the outer ring, a cage which holds individually the plurality of rolling elements, and a shield member which is mounted in an annular groove formed in an axial end portion of the outer ring and which has a ring portion extending towards the inner ring, and disposed parallel to each other on a circumference of the shaft member; and
a shield cap which is mounted on the other axial end of the shaft member and of which an axial inner surface extends in a radial direction so as to face oppositely an axial end face of the outer ring of one of the pair of bearings, characterized in that
the axial inner surface of the shield cap is formed into a stepped shape by a first cap flat surface which extends in a substantially vertical direction with respect to an axis of the shaft member, a second cap flat surface which lies radially outwards and axially outwards of the first cap flat surface and which extends in the substantially vertical direction, and a cap rising surface which connects the first and second cap flat surfaces, and in that
the axial inner surface of the shield cap is formed so that an axial minimum gap defined between the first cap flat surface and the ring portion of the shield member of the one of the pair of bearings is narrower than an axial minimum gap defined between the second cap flat surface and an axial end face of the outer ring and so that a minimum gap between the cap rising surface and a boundary position between the axial end face of the outer ring and the annular groove is narrower than the axial minimum gap between the second cap flat surface and the axial end face of the outer ring.

(2) The pivot bearing unit for the hard disk actuator according to (1) above, characterized in that the axial minimum gap between the first cap flat surface and the ring portion of the shield member of the one of the pair of bearings is set to 0.1 mm or smaller, and the axial minimum gap between the second cap flat surface and the axial end face of the outer ring is set to 0.2 mm or smaller.

(3) The pivot bearing unit for the hard disk actuator according to (1) or (2) above, characterized in that the cap rising surface is an inclined surface having a rectilinear section.

(4) The pivot bearing unit for the hard disk actuator according to (3) above, characterized in that the minimum gap between the cap rising surface of the shield cap and the boundary position between the axial end face of the outer ring and the annular groove is set to 0.1 mm or smaller.

(5) The pivot bearing unit for the hard disk actuator according to any of (1) to (4) above, characterized in that
an axial inner surface of the flange portion is formed into a stepped shape by a first flange flat surface which extends in a substantially vertical direction with respect to an axis of the shaft member, a second flange flat surface which lies radially outwards and axially outwards of the first flange flat surface and which extends in the substantially vertical direction, and a flange rising surface which connects the first and second flange flat surfaces, and in that
the axial inner surface of the flange portion is formed so that an axial minimum gap defined between the first flange flat surface and the ring portion of the shield member of the other bearing is narrower than an axial minimum gap defined between the second flange flat surface and the outer ring and so that a minimum gap between the flange rising surface and a boundary position between an axial end face of the outer ring and the annular groove is narrower than the axial minimum gap between the second flange flat surface and the axial end face of the outer ring.

(6) The pivot bearing unit for the hard disk actuator according to (5) above, characterized in that the axial minimum gap between the first flange flat surface and the ring portion of the shield member of the other bearing is set to 0.1 mm or smaller, and the axial minimum gap between the second flange flat surface and the axial end face of the outer ring is set to 0.2 mm or smaller.

(7) The pivot bearing unit for the hard disk actuator according to (5) or (6) above, characterized in that the flange rising surface is an inclined surface having a rectilinear section.

(8) The pivot bearing unit for the hard disk actuator according to (7) above, characterized in that the minimum gap between the flange rising surface of the flange portion and the boundary position between the axial end face of the outer ring and the annular groove is set to 0.1 mm or smaller.

(9) The pivot bearing unit for the hard disk actuator according to any of (1) to (8) above, characterized by including further a housing which is fitted on the outer rings of the pair of bearings.

Advantage of the Invention

According to the pivot bearing unit for the hard disk actuator, the axial inner surface of the shield cap is formed into the stepped shape by the first cap flat surface which extends in the substantially vertical direction with respect to the axis of the shaft member, the second cap flat surface which lies radially outwards and axially outwards of the first cap flat surface and which extends in the substantially vertical direction, and the cap rising surface which connects the first and second cap flat surfaces, and the axial inner surface of the shield cap is formed so that the axial minimum gap defined between the first cap flat surface and the ring portion of the shield member of the one of the pair of bearings is narrower than the axial minimum gap defined between the second cap flat surface and the axial end face of the outer ring and so that the minimum gap between the cap rising surface and the boundary position between the axial end face of the outer ring and the annular groove is narrower than the axial minimum gap between the second cap flat surface and the axial end face of the outer ring. By adopting this configuration, the positions where the gap defined between the shield cap and the bearing is narrow are increased, as a result of which the labyrinth of a long distance is formed, thereby making it possible to reduce outparticles by reducing the amount of air which passes through the interiors of the bearings.

BRIEF DESCRIPTION OF THE DRAWINGS

FIG. 2A is an enlarged view of a portion II in FIG. 1 and FIG. 2B is an enlarged view of a portion II' in FIG. 1.

MODES FOR CARRYING OUT THE INVENTION

Figure 3A:
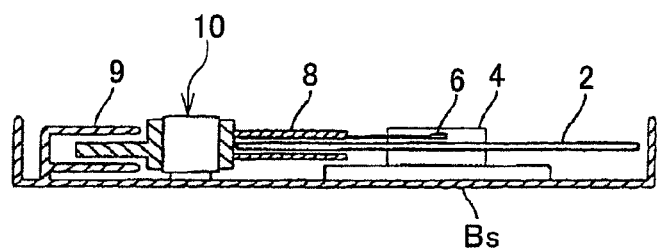
FIG. 3A is a sectional view showing schematically an overall configuration of an HDD.
Figure 3B:
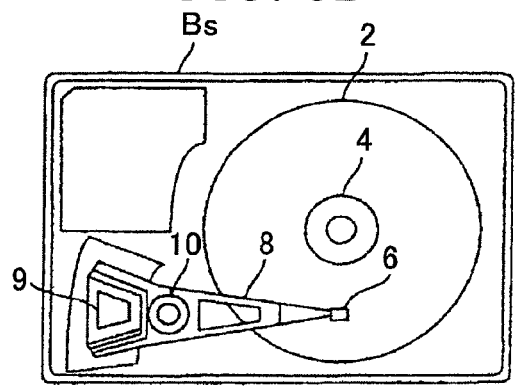
FIG. 3B is a plan view showing the overall configuration of the HDD.
Figure 3C:
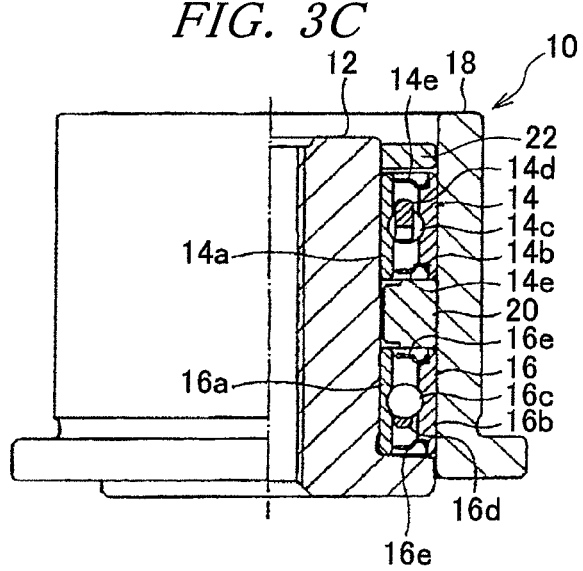
FIG. 3C is a sectional view showing the pivot bearing unit.

Hereinafter, an embodiment of a pivot bearing unit for a hard disk actuator according to the invention will be described in detail by reference to the drawings. A substantial configuration of an HDD to which the pivot bearing unit of this embodiment is applied is similar to a configuration shown in FIGS. 3A to 3C, and therefore, only the pivot bearing unit will be described.

Figure 1:
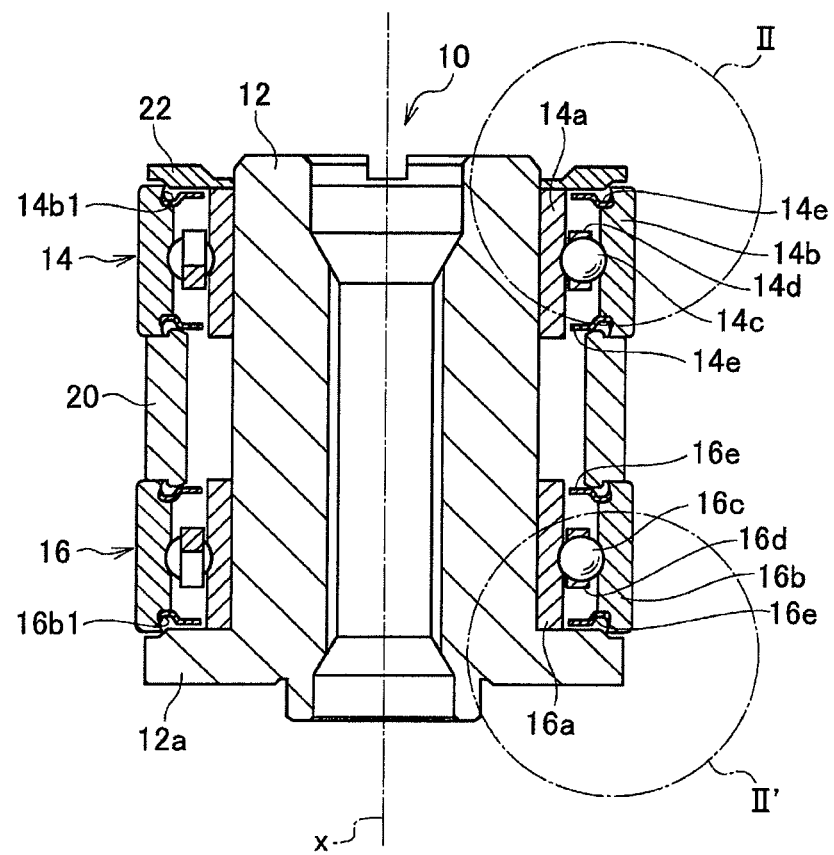
FIG. 1 is a sectional view showing an HDD actuator pivot bearing unit according to an embodiment of the invention.

As shown in FIGS. 1 to 2B, a pivot bearing unit 10 has a shaft member 12 having a flange portion 12a at an axial end portion, a sleeve (refer to FIG. 3) 18 functioning as a housing which is disposed concentrically with the shaft member 12, and a pair of bearings 14, 16 parallel to each other between the shaft member 12 and the sleeve 18.

The pair of bearings 14, 16 include individually inner rings 14a, 16a, outer rings 14b, 16b, pluralities of balls (rolling elements) 14c, 16c which are disposed between the inner rings 14a, 16a and the outer rings 14b, 16b, cages 14d, 16d which hold the pluralities of balls 14c, 16c, respectively, and non-contact type shield members 14e, 16e which are mounted in annular grooves 14b1, 16b1 which are formed in axial end portions of both the outer rings 14b, 16b. In addition, an annular spacer 20 is interposed between the outer rings 14b, 16b of the rolling bearings 14, 16.

As shown in FIGS. 2A and 2B, the shield members 14e, 16e include mounting portions 14e1, 16e1 which are mounted in the annular grooves 14b1, 16b1, ring portions 14e2, 16e2 which lie axially outwards and radially inwards of the mounting portions 14e1, 16e1 and which extend in a substantially vertical direction with respect to an axis x of the shaft member 12, and inclined portions 14e4, 16e4 which connect bottom portions 14e3, 16e3 of the mounting portions 14e1, 16e1 which abut with axially outward side surfaces 14b2, 16b2 of the annular grooves 14b1, 16b1 and ring portions 14e2, 16e2. Incidentally, the mounting portions 14e1, 16e1 may be formed into a curled configuration by being crimped or a configuration in which the mounting portions are fixed in place by a snap ring, in addition to the configuration of this embodiment. Additionally, although the ring portions 14e2, 16e2 are formed into a flat plate configuration which extends in the substantially vertical direction with respect to the axis x of the shaft member 12, shaped so that they are fixed in place curled shaped, the ring portions may be curved as long as they are configured so as to extend towards the inner rings 14a, 16a.

A shield cap 22 is mounted at the other axial end of the shaft member 12, and this shield cap 22 extends in a radial direction so as to face oppositely an axial end face of the outer ring 14b of the bearing 14, which is one of the pair of bearings 14, 16 on an axial inner surface 22a thereof.

The axial inner surface 22a of this shield cap 22 is formed into a stepped shape by a first cap flat surface 22a1 which extends in the substantially vertical direction with respect to the axis x of the shaft member 12, a second cap flat surface 22a2 which lies radially outwards and axially outwards of the first cap flat surface 22a1 and which extends in the substantially vertical direction, and a cap rising surface 22a3 which is an inclined surface having a rectilinear section and which connects the first and second flat surfaces 22a1, 22a2. Additionally, an axial outer surface 22b of the shield cap 22 is also formed into a stepped shape. Specifically, the cap rising surface 22a3 of the axial inner surface 22a is positioned further radially outwards than a cap rising surface 22b1 of the axial outer surface 22b, and a portion between both the cap rising surfaces 22a3, 22b1 is formed thick as seen in a radial direction. The other surfaces of the axial outer surface 22b other than the cap rising surface 22b1 are formed into flat surface shapes which extend in the substantially vertical direction with respect to the axis x of the shaft member 12.

In addition, the axial inner surface 22a of the shield cap 22 is formed so that an axial minimum gap a1 defined between the first cap flat surface 22a1 and the ring portion 14e2 of the shield member 14e of the one bearing 14 is narrower than an axial minimum gap a2 defined between the second cap flat surface 22a2 and an axial end face of the outer ring 14b.

Additionally, a boundary position between the first cap flat surface 22a1 and the cap rising surface 22a3 is positioned further radially outwards than a radial outer end portion 14e5 of the ring portion 14e2 of the shield member 14e, and a boundary position between the cap rising surface 22a3 and the second cap flat surface 22a2 is positioned further radially outwards than a boundary position 14b3 between the axial end face of the outer ring 14b and the annular groove 14b1.

Then, the axial inner surface 22a of the shield cap 22 is also formed so that a minimum gap a3 defined between the cap rising surface 22a3 of the shield cap 22 and the boundary position 14b3 between the axial end face of the outer ring 14b and the annular groove 14b1 is narrower than the axial minimum gap a2 between the second cap flat surface 22a2 and the axial end face of the outer ring 14b.

Consequently, a labyrinth having a long distance is formed by a radial gap between the shield member 14e and the inner ring 14a, the axial minimum gap a1 defined between the ring portion 14e2 of the shield member 14e and the first cap flat surface 22a1 of the shield cap 22, and the minimum gap a3 defined between the cap rising surface 22a3 and the boundary position 14b3 between the axial end face of the outer ring 14b and the annular groove 14b1. By forming the labyrinth in this way, the pivot bearing unit 10 is provided which reduces the discharge of outparticles by reducing the amount of air passing through the interior of the bearing.

In particular, further, a narrow gap area that is defined between the cap rising surface 22a3 and the boundary position 14b3 on the outer ring 14b is provided further radially outwards than a narrow gap area that is defined between the ring portion 14e2 of the shield member 14e and the first cap flat surface 22a1 of the shield cap 22, and therefore, the flow of air in the axial gap between the shield cap 22 and the bearing 14 can be suppressed.

In this embodiment, the axial minimum gap a1 defined between the first cap flat surface 22a1 and the ring portion 14e2 of the shield member 14e of the bearing 14 is set to 0.01 mm or larger and 0.1 mm or smaller, the axial minimum gap a2 defined between the second cap flat surface 22a2 and the axial end face of the outer ring 14 is set to 0.04 mm or larger and 0.2 mm or smaller, and the minimum gap a3 defined between the boundary position 14b between the axial end face of the outer ring 14b and the annular groove 14b and the cap rising surface 22a3 of the shield cap 22 is set to 0.01 mm or larger and 0.1 mm or smaller.

In addition, an axial inner surface 12b of the flange portion 12a of the shaft member 12 is formed into a stepped shape in which the flange portion 12a becomes thin at a radially outward portion by a first flange flat surface 12b1 which extends in a substantially vertical direction with respect to the axis x of the shaft member 12, a second flange flat surface 12b2 which lies radially outwards and axially outwards of the first flange flat surface 12b1 and which extends in the substantially vertical direction and a flange rising surface which is an inclined surface having a rectilinear section and which connects the first and second flange flat surfaces 12b1, 12b2.

Then, the axial inner surface 12b of the flange portion 12a is formed so that an axial minimum gap b1 defined between the first flange flat surface 12b1 and the ring portion 16e2 of the shield member 16e of the other bearing 16 is narrower than an axial minimum gap b2 defined between the second flange flat surface 12b2 and an axial end face of the outer ring 16.

Additionally, a boundary position between the first flange flat surface 12b1 and the flange rising surface 12b3 is positioned further radially outwards than a radial outer end portion 16e5 of the ring portion 16e2 of the shield member 16e, and a boundary position 12b5 between the flange rising surface 12b3 and the second flange flat surface 12b2 is positioned further radially outwards than a boundary position 16b3 between the axial end face of the outer ring 16b and the annular groove 16b1.

Then, the axial inner surface 12b of the flange portion 12a is also formed so that a minimum gap b3 defined between the flange rising surface 12b3 of the flange portion 12a and the boundary position 16b3 between the axial end face of the outer ring 16 and the annular groove 16b1 is narrower than the axial minimum gap b2 defined between the second flange flat surface 12b2 and the axial end face of the outer ring 16.

Consequently, a labyrinth having a long distance is formed by a radial gap defined between the shield member 16e and the inner ring 16a, the axial minimum gap b1 defined between the shield member 16e and the axial inner surface 12b of the flange portion 12a and the minimum gap b3 defined between the flange rising surface 12b3 and the boundary position 16b3 between the axial end face of the outer ring 16 and the annular groove 16b1. By forming the labyrinth in this way, the pivot bearing unit 10 is provided which reduces the discharge of outparticles by reducing the amount of air passing through the interior of the bearing also at the axial end thereof.

In particular, further, a narrow gap area defined between the flange rising surface 12b3 and the boundary position 16b3 on the outer ring 16b is provided further radially outwards than a narrow gap area defined between the ring portion 16e2 of the shield member 16e and the first flange flat surface 12b1 of the flange portion 12a, and therefore, the flow of air in the axial gap defined between the flange portion 12a and the bearing 16 can be suppressed.

In this embodiment, the axial minimum gap a1 defined between the first flange flat surface 12b1 and the ring portion 16e2 of the shield member 16e of the bearing 16 is set to 0.01 mm or larger and 0.1 mm or smaller, the axial minimum gap a2 defined between the second flange flat surface 12b2 and the axial end face of the outer ring 16b is set to 0.04 mm or larger and 0.2 mm or smaller, and the minimum gap b3 defined between the boundary position 16b3 between the axial end face of the outer ring 16 and the annular groove 16b1 and the flange rising surface 12b3 of the flange portion 12a is set to 0.01 mm or larger and 0.1 mm or smaller.

Figure 4A:
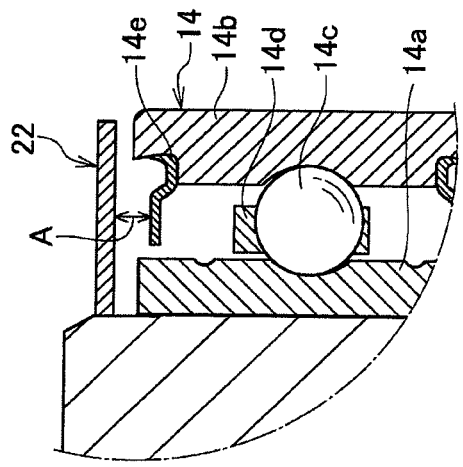
FIGS. 4A and 4B are enlarged views of shield cap portions of conventional HDD actuator pivot bearing units.
Figure 4B:
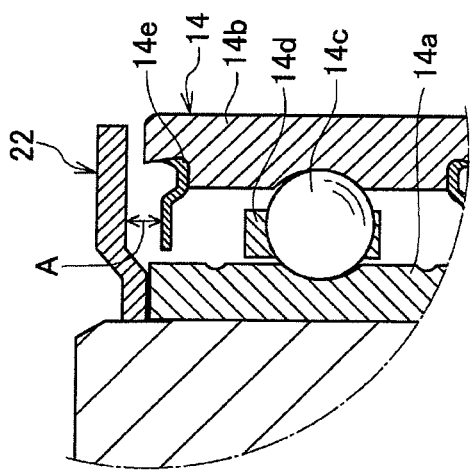

Here, an experiment was carried out on the discharge amount of outparticles by employing the pivot bearing unit including the shield cap 22 of this embodiment and a pivot bearing unit including the conventional shield cap 22 shown in FIG. 4A. In this experiment, the flange portions 12a of the pivot bearing units were both formed into the conventional stepped shape shown in FIG. 5 for comparison. Additionally, the sizes of the bearings used in the experiment were 8 mm in outside diameter, 5 mm in bore diameter, and 2.5 mm in width. The axial minimum gap a1 defined between the axial inner surface 20a of the shield cap 20 and the shield member 14e was set to 0.09 mm in the pivot bearing unit of this embodiment and to 0.27 mm for the conventional pivot bearing unit.

It has been confirmed from the results of the experiment that the amount of particles discharged was 0.448 $\mu m^3$/min with the conventional shield cap 22, while the amount of particles discharged was 0.049 $\mu m^3$/min with the shield cap 20 of this embodiment and that the amount of particles discharged can be suppressed by employing the shield cap 22 of the embodiment.

Figure 5:
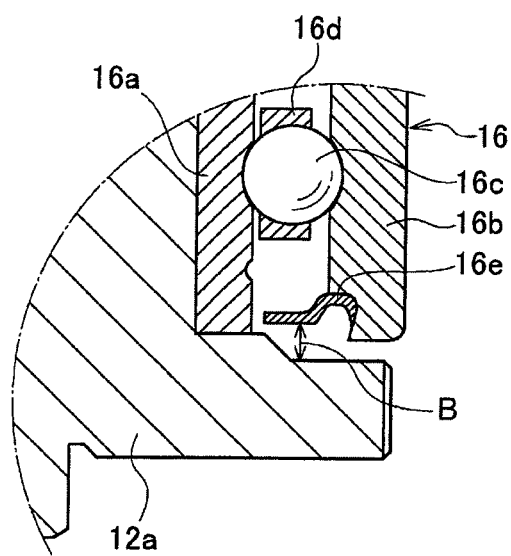
FIG. 5 is an enlarged view of a flange portion of the conventional HDD actuator pivot bearing unit.
Figure 6:
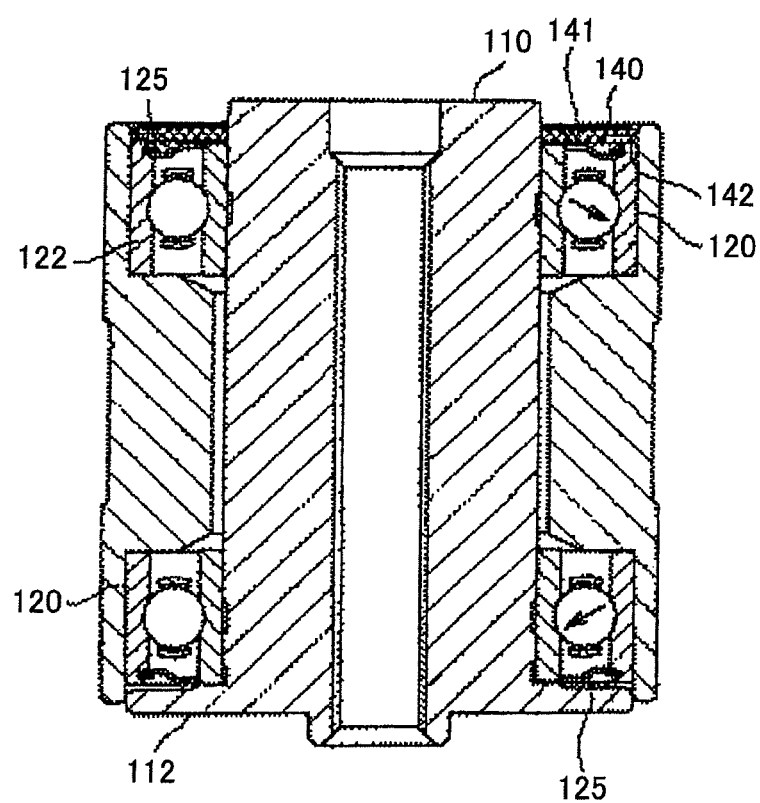
FIG. 6 is a sectional view showing another conventional hard disk drive pivot assembly.

Next, an experiment was carried out on the discharge amount of particles by employing the pivot bearing unit including the shield cap 22 and the flange portion 12a of this embodiment, the shield cap 22 of this embodiment and the conventional flange portion 12a shown in FIG. 5. It has been confirmed from the results of the experiment that the amount of particles discharged was 0.007 $\mu m^3$/min with the flange portion 12a of the embodiment and that the amount of particles discharged can be suppressed further by employing the flange portion 12a of the embodiment.

The invention is not limited to the embodiment described above but can be modified or improved as required.

For example, the bearings 14, 16 are not particularly limited to the configurations shown in the figures and hence can take arbitrary configurations according to purposes of applications or using conditions of HDDs. In addition, although the shaft member 12 is described has having the hollow construction in which an axial portion is made hollow along the extending direction, the shaft member 12 can have a solid construction.

Additionally, the shield cap 22 of this embodiment is made up of the member having the different thicknesses in the radial direction and is formed by cutting with high machining accuracy. However, the shield cap 22 may be made up by bending a flat sheet material through pressing so as to satisfy the relation between the axial minimum gaps a1, a2, a3 of the invention. As this occurs, the shield cap 22 can be produced at low cost.

The invention is based on Japanese Patent Application (No. 2011-164759) filed on Jul. 27, 2011 and International Patent Application (PCT/JP2012/054448) filed on Feb. 23, 2012, the contents of which are incorporated herein by reference.

DESCRIPTION OF REFERENCE NUMERALS AND SIGNS 10 pivot bearing unit;
14, 16 bearing;
14a, 16a inner ring;
14b, 16b outer ring;
14c, 16c ball (rolling element);

14e, 16e non-contact type shield member;
18 sleeve (housing);
22 shield cap;
22a axial inner surface;
22a1 first cap flat surface;
22a2 second cap flat surface;
22a3 cap rising surface.

The invention claimed is:

1. A pivot bearing unit for a hard disk actuator comprising:
a shaft member having a flange portion at an axial end portion;
a pair of bearings each including an inner ring, an outer ring, a plurality of rolling elements interposed between the inner ring and the outer ring, a cage which holds individually the plurality of rolling elements, and a shield member which is mounted in an annular groove formed in an axial end portion of the outer ring and which has a ring portion extending towards the inner ring, and the pair of bearings are disposed parallel to each other on an outer circumference of the shaft member; and
a shield cap which is mounted on the other axial end of the shaft member and of which an axial inner surface extends in a radial direction so as to face oppositely an axial end face of the outer ring of one of the pair of bearings, wherein
the axial inner surface of the shield cap is formed into a stepped shape by a first cap surface which faces oppositely the ring portion of the shield member of the one bearing, a second cap surface which lies radially outwards and axially outwards of the first cap surface and which faces oppositely the axial end face of the outer ring, and a cap rising surface which connects the first and second cap surfaces; and
the axial inner surface of the shield cap is formed so that an axial minimum gap defined between the first cap surface and the ring portion of the shield member of the one bearing is narrower than an axial minimum gap defined between the second cap surface and the axial end face of the outer ring and so that a minimum gap defined between the cap rising surface and a boundary position between the axial end face of the outer ring and the annular groove is narrower than the axial minimum gap between the second cap surface and the axial end face of the outer ring.

2. The pivot bearing unit for the hard disk actuator according to claim 1, wherein
the axial minimum gap between the first cap surface and the ring portion of the shield member of the one bearing is set to 0.1 mm or smaller, and the axial minimum gap between the second cap surface and the axial end face of the outer ring is set to 0.2 mm or smaller.

3. The pivot bearing unit for the hard disk actuator according to claim 1, wherein
the cap rising surface is an inclined surface having a rectilinear section.

4. The pivot bearing unit for the hard disk actuator according to claim 1, wherein
the minimum gap between the cap rising surface of the shield cap and the boundary position between the axial end face of the outer ring and the annular groove is set to 0.1 mm or smaller.

5. The pivot bearing unit for the hard disk actuator according to claim 1, wherein
an axial inner surface of the flange portion is formed into a stepped shape so that an axial gap with the shield member of the other bearing is narrower than an axial gap with the outer ring.

6. The pivot bearing unit for the hard disk actuator according to claim 5 wherein:
the shield member is mounted in an annular groove formed in an axial end portion of the outer ring and has a ring portion which extends towards the inner ring;
the axial inner surface of the flange portion is formed into a stepped shape by a first flange surface which faces oppositely the ring portion of the shield member of the other bearing, a second flange surface which lies radially outwards and axially outwards of the first flange surface and which faces oppositely the axial end face of the outer ring, and a flange rising surface which connects the first and second flange surfaces; and
the axial inner surface of the flange portion is formed so that an axial minimum gap defined between the first flange surface and the ring portion of the shield member of the other bearing is narrower than an axial minimum gap defined between the second flange surface and the axial end face of the outer ring and so that a minimum gap defined between the flange rising surface and a boundary position between the axial end face of the outer ring and the annular groove is narrower than the axial minimum gap between the second flange surface and the axial end face of the outer ring.

7. The pivot bearing unit for the hard disk actuator according to claim 5, wherein
the axial minimum gap between the first flange surface and the ring portion of the shield member of the other bearing is set to 0.1 mm or smaller, and the axial minimum gap between the second flange surface and the axial end face of the outer ring is set to 0.2 mm or smaller.

8. The pivot bearing unit for the hard disk actuator according to claim 5, wherein
the flange rising surface is an inclined surface having a rectilinear section.

9. The pivot bearing unit for the hard disk actuator according to claim 5, wherein
the minimum gap between the flange rising surface of the flange portion and the boundary position between the axial end face of the outer ring and the annular groove is set to 0.1 mm or smaller.

10. The pivot bearing unit for the hard disk actuator according to claim 1, further comprising:
a housing which is fitted on the outer rings of the pair of bearings.

* * * * *